A. DAY.
CONDENSER.
APPLICATION FILED FEB. 3, 1914.

1,134,518. Patented Apr. 6, 1915.

WITNESSES:
M. A. Johnson
H. Trautvetter

INVENTOR
Abraham Day,
BY
Dyke & Campfield,
ATTORNEYS.

ABRAHAM DAY, OF BLOOMFIELD, NEW JERSEY, ASSIGNOR OF ONE-FOURTH TO ALFRED R. HOPKINS, OF MONTCLAIR, NEW JERSEY.

CONDENSER.

1,134,518.

Specification of Letters Patent. Patented Apr. 6, 1915.

Application filed February 3, 1914. Serial No. 816,205.

*To all whom it may concern:*

Be it known that I, ABRAHAM DAY, a citizen of the United States, and a resident of Bloomfield, county of Essex, and State of New Jersey, have invented certain new and useful Improvements in Condensers, of which the following is a specification.

My invention relates to condensers. While the same is of special value in the condensation of gaseous ammonia into liquid form in refrigerating apparatus, ice-making plants and the like, it is generally applicable to condensing matter from the gaseous into the liquid state. For the sake of giving a clear description of my invention, however, I shall describe it as applied to a condenser for condensing ammonia gas into liquid ammonia. As the ammonia gas coming from the generator enters the condenser in a gaseous form and emerges therefrom condensed into a liquid form, at intermediate stages in the condenser, it is part gas and part liquid.

The rapidity with which the condensation is accomplished depends on the readiness with which the heat from the gas is transferred to the cooling medium outside the pipes of the condenser through which the gas is flowing. The transfer of heat from the gas to the walls of the pipes, and thence to the cooling medium, is relatively slow as compared to the transfer of heat from gas to liquid with which it is brought into intimate contact, and thence through the pipes to the cooling medium.

My invention has, among its objects, the provision of an apparatus whereby the uncondensed gas in the condenser is brought into intimate contact with the liquid therein so as to facilitate the transfer of heat in the manner just referred to and to produce a condenser of improved efficiency, and with the foregoing and related objects in view, my invention consists in the parts, improvements and combinations herein set forth and claimed.

Figure 1:
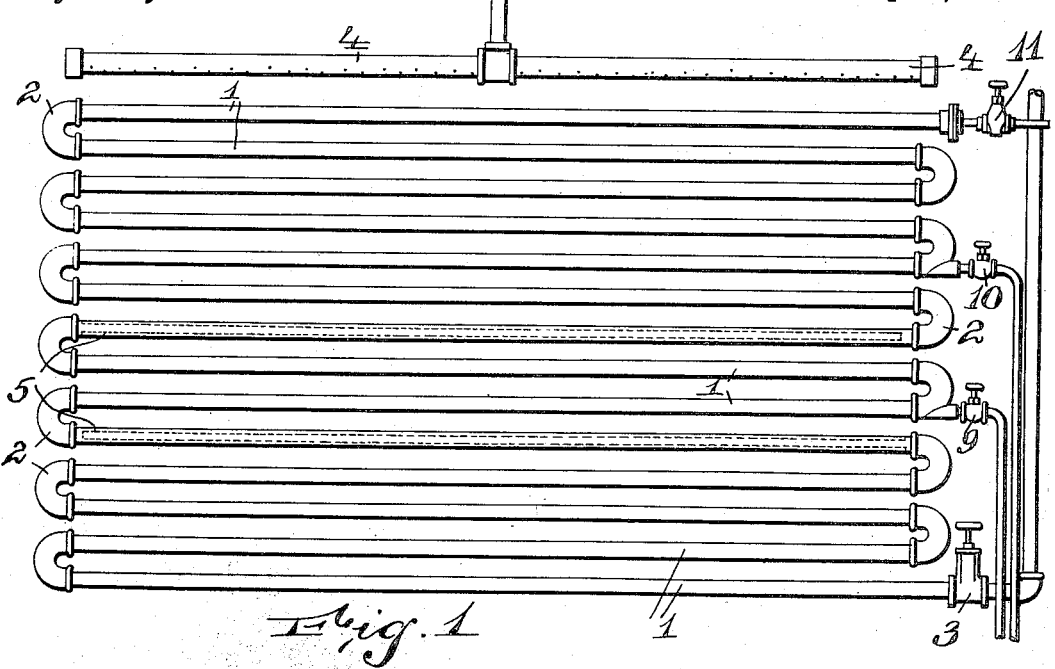
Figure 2:
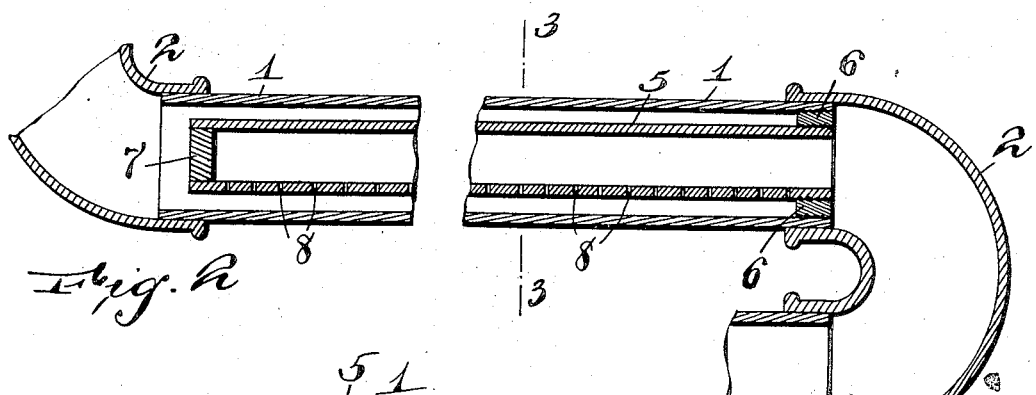
Figure 3:

In the drawings forming part of this specification, Figure 1 is a view, in side elevation, of one unit of a trombone condenser coil involving my invention. Fig. 2 is an enlarged detail of a portion thereof in central vertical cross-section, and Fig. 3 is a cross-section taken on the line 3—3 in Fig. 2.

The condenser comprises an elongated heat conducting container, which may consist of a pipe coil, preferably of the trombone type, including the pipes 1 and the return bends 2. The gaseous ammonia is preferably admitted at the bottom thereof, an inlet valve for this purpose being indicated at 3. Suitable means for cooling the pipes is provided. A series of perforated water pipes, as 4, arranged above the coils, may be used for this purpose and are shown for simplicity of illustration, though any means for exterior cooling may be resorted to, as will be understood.

Where the gaseous ammonia is admitted at the bottom of the coil, a suitable number of plain coils of the usual form are preferably provided at the bottom wherein the gas may part with its sensible and latent heat and liquefaction may be commenced in the ordinary manner. At such point in the apparatus, as the liquefaction becomes appreciable, and preferably at intervals thereafter, I provide means for securing an intimate contact between the uncondensed gas and the ammonia already condensed into liquid form. In the construction shown the first of the pipes provided with such means is the fifth from the bottom, four pipes being left below it for the preliminary cooling and partial liquefaction of the gas, though the precise location may be varied to suit the conditions of the particular installation. In the form shown such means for mingling the uncondensed gas and the condensed liquid ammonia consists of pipes 5 of smaller diameter than the pipes 1 and arranged preferably concentrically, or nearly so, therein. Any means for securing the pipes 5 in place within the pipes 1 may be resorted to. In the form shown I have illustrated interiorly and exteriorly threaded reducer rings 6 for this purpose which may be screwed within the pipes 1, and may have the entrance end of the pipes 5 screwed therein, thus leading all the material passing through the condenser into the pipes 5, but other forms of connection may be used, and while, in the form shown, such connection is made at the points where the pipes 1 meet the return bends 2, the connecting means may be located at other points. The pipes 5 or other gas and liquid mingling devices are so constructed and arranged as that the matter entering the same can escape only at or near the lower sides thereof. To secure this result in the form shown, such pipes 5 are closed at their ends 7 and are provided with a plurality of perforations 8, 8 in their lower sides. With such arrangement the gaseous ammonia, in its passage through the condenser, is forced down into intimate contact with any liquid therein which may have been formed by condensation or supplied from other sources, and is intimately mingled therewith in the form of small bubbles so that its heat is rapidly transferred to the liquid and thence to the surrounding pipes and cooling medium, and the liquefaction of the gas is facilitated and the efficiency of the apparatus increased. I may provide any desired number of the pipes 5 or other gas and liquid mingling devices. In the form shown two of the pipes 5 are illustrated, one in the fifth of the pipes 1 counting from the bottom of the trombone coil, and one in the eighth of such pipes, but the location and number thereof may be varied.

Means for drawing off the condensed liquid are provided at suitable points. As but a small quantity of liquid need be present in the pipes 1 to secure an intimate mingling of the gas therewith, part of the condensed ammonia may be drawn off immediately above each of the pipes 5 and I have therefore illustrated draw-off cocks 9 and 10 in the return bends which are traversed immediately after the contents of the condenser pass through the pipes 5, 5, but the draw-off cocks need not be located at the precise points shown, and may vary in number as well as location from the precise showing made in the drawings. A draw-off cock 11 is provided for taking off any uncondensable gases, and with a coil such as shown, such cock 11 is located in the uppermost of the pipes 1. The operation of the apparatus has been sufficiently set forth in connection with the description thereof so that a further statement of operation is unnecessary.

While I have illustrated a specific form of apparatus, it is to be understood that the same is for purposes of illustration only, and that departures may be made within the scope of my claims without departing from my invention or sacrificing any of its advantages.

Having thus described my invention, I claim:

1. In a condenser, an elongated heat conducting container, means for exteriorly cooling the same, and means in said container for directing the uncondensed gas toward the bottom thereof to bring it into intimate contact with any liquid present therein, substantially as set forth.

2. In a condenser, an elongated heat conducting container, means for exteriorly cooling the same, and a plurality of means in said container spaced apart from one another for directing the uncondensed gas toward the bottom thereof to bring it into intimate contact with any liquid present therein, substantially as set forth.

3. In a condenser, an elongated heat conducting container comprising one or more upwardly directed portions past which material passing through said container must rise, and means adjacent to said upwardly directed portions for leading the uncondensed gas downward into contact with any liquid present therein, substantially as set forth.

4. In a condenser, a pipe coil, cooling means therefor, and means at separated places in said coil for leading uncondensed gas downwardly to the neighborhood of the lower part of the pipe coil into intimate contact with the condensed liquid therein, substantially as set forth.

5. In a condenser, a pipe coil comprising return bends and intermediate pipe lengths placed one above another, and means in one or more of said pipe lengths for leading the uncondensed gas downwardly to the neighborhood of the lowest part of the pipe coil into intimate contact with the condensed liquid therein, substantially as set forth.

6. In a condenser, a trombone pipe coil, one or more pipes thereof having a pipe of smaller diameter therein and spaced away from the lower wall thereof, such inner pipe being open at its entrance end and being closed at the opposite end and being provided with a plurality of perforations on its lower side, substantially as set forth.

7. In a condenser, a cooling pipe, a pipe therein of reduced diameter, means for closing the space between the inner and outer pipes at the entry end of such inner pipe, and said inner pipe being closed at its opposite end and being provided with perforations in its lower side to lead material passed therethrough downward and close to the lower side of the outer pipe, substantially as set forth.

8. In a condenser, a trombone pipe coil, means in a portion of the pipe coil for leading uncondensed gas into intimate contact with liquid therein, and a plurality of liquid bleeding means placed adjacent to said leading means, substantially as set forth.

9. In a condenser, a pipe coil rising in return bends one above another, cooling means, a valve for admitting ammonia gas to the coil at substantially the bottom thereof, a pipe of reduced diameter within the said coil through which the ammonia must pass and situated at a distance in said coil from the entry end thereof, said inner pipe being provided with perforations in its lower side only to lead the uncondensed ammonia downward into contact with the condensed ammonia, substantially as set forth.

10. In a condenser, a pipe coil comprising a plurality of pipe sections arranged one above another, and return bends connecting the same, cooling means, a valve for admitting ammonia gas at substantially the bottom thereof, pipe sections of reduced diameter in certain of said pipe coil sections and provided with perforations on their lower sides to conduct the gaseous ammonia into contact with the liquid ammonia, draw-off cocks placed adjacent to the inner pipe sections, and a relief cock at the top of the coil for permitting the escape of uncondensable gas, substantially as set forth.

11. In a condenser, an elongated container, cooling means therefor, means for admitting gas thereto, means for drawing off the condensed liquid, and means interposed in said container between the admission and draw-off means for positively securing an intimate contact between the gas passing through said container and the liquid therein, substantially as set forth.

In testimony that I claim the foregoing I have hereto set my hand this 28th day of January, 1914.

ABRAHAM DAY.

Witnesses:
  WM. H. CAMFIELD,
  M. A. JOHNSON.